United States Patent [19]

Carson

[11] Patent Number: 5,235,672
[45] Date of Patent: Aug. 10, 1993

[54] HARDWARE FOR ELECTRONIC NEURAL NETWORK

[75] Inventor: John C. Carson, Corona del Mar, Calif.

[73] Assignee: Irvine Sensors Corporation, Costa Mesa, Calif.

[21] Appl. No.: 651,477

[22] Filed: Feb. 6, 1991

[51] Int. Cl.⁵ .................. H01L 21/90; G06F 15/18
[52] U.S. Cl. .................................... 395/24; 395/11; 395/22; 437/208
[58] Field of Search ............ 395/24, 11, 25, 22; 437/208

[56] References Cited

U.S. PATENT DOCUMENTS

| | | | |
|---|---|---|---|
| 4,354,107 | 10/1982 | Carson et al. | 250/208.1 |
| 4,525,921 | 7/1985 | Carson et al. | 437/208 |
| 4,551,629 | 11/1985 | Carson et al. | 437/208 |
| 4,646,128 | 2/1987 | Carson et al. | 257/777 |
| 4,659,931 | 4/1987 | Schmitz et al. | 361/414 |
| 4,672,737 | 6/1987 | Carson et al. | 437/208 |
| 4,779,005 | 10/1988 | Arnold | 250/578 |
| 4,912,647 | 3/1990 | Wood | 395/23 |
| 4,974,169 | 11/1990 | Engel | 395/11 |
| 4,983,533 | 1/1991 | Go | 361/388 |
| 4,988,891 | 1/1991 | Mashiko | 395/25 |
| 5,045,685 | 9/1991 | Wall | 250/208.1 |
| 5,078,952 | 1/1992 | Gozani et al. | 395/22 |
| 5,109,275 | 4/1992 | Naka et al. | 395/22 |

Primary Examiner—Allen R. MacDonald
Assistant Examiner—George Davis
Attorney, Agent, or Firm—Thomas J. Plante

[57] ABSTRACT

This application discloses hardware suitable for use in a neural network system. It makes use of Z-technology modules, each containing densely packaged electronic circuitry. The modules provide access planes which are electrically connected to circuitry located on planar surfaces interfacing with such access planes. One such planar surface comprises a resistive feedback network. By combining two Z-technology modules, whose stacked chips are in planes perpendicular to one another, and using switching networks between the two modules, the system provides bidirectional accessibility of each individual electronic element in the neural network to most or all of the other individual electronic elements in the system.

14 Claims, 9 Drawing Sheets

HARDWARE FOR ELECTRONIC NEURAL NETWORK

BACKGROUND OF THE INVENTION

This application relates to hardware systems useful in implementing electronic neural network concepts.

There has been a recent resurgence of interest in the neural network concept as a new approach to computing. "The collective behavior of neural network systems has demonstrated useful computational properties for associative memory functions, fault-tolerant pattern recognition, and combinatorial optimization problem solving." The preceding sentence is copied from "Electronic hardware implementations of neural networks" by Thakoor, Moopenn, Lambe, and Khanna, of the California Institute of Technology, published in Applied Optics, Vol. 26, page 5085, Dec. 1, 1987.

The quoted article also states: "The study of the dynamics, learning mechanisms, and computational properties of neural networks has been largely based on computer software simulations." Subsequently it discusses neural network hardware: "The availability of neural network hardware would greatly enhance the present efforts in neural network research. Furthermore, the hardware would not only serve as research tools to aid in the development and evaluation of neural network concepts, but they would also provide the basis for development of application-specific architectures for implementing neural network approaches to real-life problems".

The present application discloses a novel approach to solving the major problems involved in providing hardware implementation of electronic neural networks.

The article quoted above identifies (pages 5087–5088) several research programs directed toward developing electronic neural network hardware. The requirements of neural network hardware include extreme interconnection capabilities, i.e., each of many parallel signals must have access to all of the other signals via individual weighted feedback networks. Also the processing nodes which are responsible for decision making must have bi-directional selective access to innumerable incoming signals.

The assignee of this application has been a leader in developing three-dimensional readout arrays for imaging sensor systems. Neural networks offer the potential for a quantum leap in the capabilities of imaging sensor systems. The critical neural network implementation factors are: weighted interconnect between all detector outputs; parallel, linear processing of each detector output; fan-out to multiple (thousands of) processing nodes per detector output; and the ability to independently change interconnect weights and processor node connections within the detector integration times. For a $128 \times 128$ pixel detector array, the number of desirable interconnects could be as high as $10^{15}$ per second, compared to the approximate $10^9$ rates achieved presently with off-focal plane digital processors. This application describes a new way of interconnecting three-dimensional focal plane readout modules and of laying out their component integrated circuits that appears to fulfill the very high interconnect rate requirements of neural networks.

SUMMARY OF THE PRESENT INVENTION

The present invention provides a resistive feedback network which is located on a plane separate from, but readily accessible to, the parallel input signals in a three-dimensional module.

It also provides a location for processing nodes in a module separate from the module containing the parallel input signals. And the interface between the modules may contain switching (or other selective interconnecting) options which give the desired level of bi-directional accessibility of each individual electronic element in the system to most or all of the other individual electronic elements in the system.

A multiplicity of stacked IC chips, each containing many parallel channels may be used to carry the desired number of parallel signals. The stacked chips constitute a parallelepiped (generally cube-shaped) module which may be accessed on six sides. One access side may receive signal inputs. Another access side may be interfaced with the plane containing the resistive feedback network, in which network every parallel signal is connected by a resistive network to every other parallel signal.

A second, similarly structured module containing stacked IC chips, which chips carry processing nodes, may engage the first module, with the planes of the chips in the second module at right angles to the planes of the chips in the first module. This arrangement, combined with switching networks adjacent to the inter-engaging access planes of the two modules, makes it possible to connect any one of the nodes carried by the second module to any one of the parallel signals carried by the first module.

A central processing unit may be located on a plane separate from, but readily accessible to, the processing nodes. And it may interface with one planar surface of the second module.

The use of three-dimensional modules in electronic neural network hardware provides major (and perhaps crucial) benefits because of the multiplicity of available access planes.

The present invention mimics available models of eye/brain architecture, in that it provides simultaneous access by multiple layers of processing nodes to all of the detector (or other input signal) array outputs in a way such that the interconnections can be variably, independently weighted.

DETAILED DESCRIPTION OF SPECIFIC EMBODIMENTS

Figure 1:
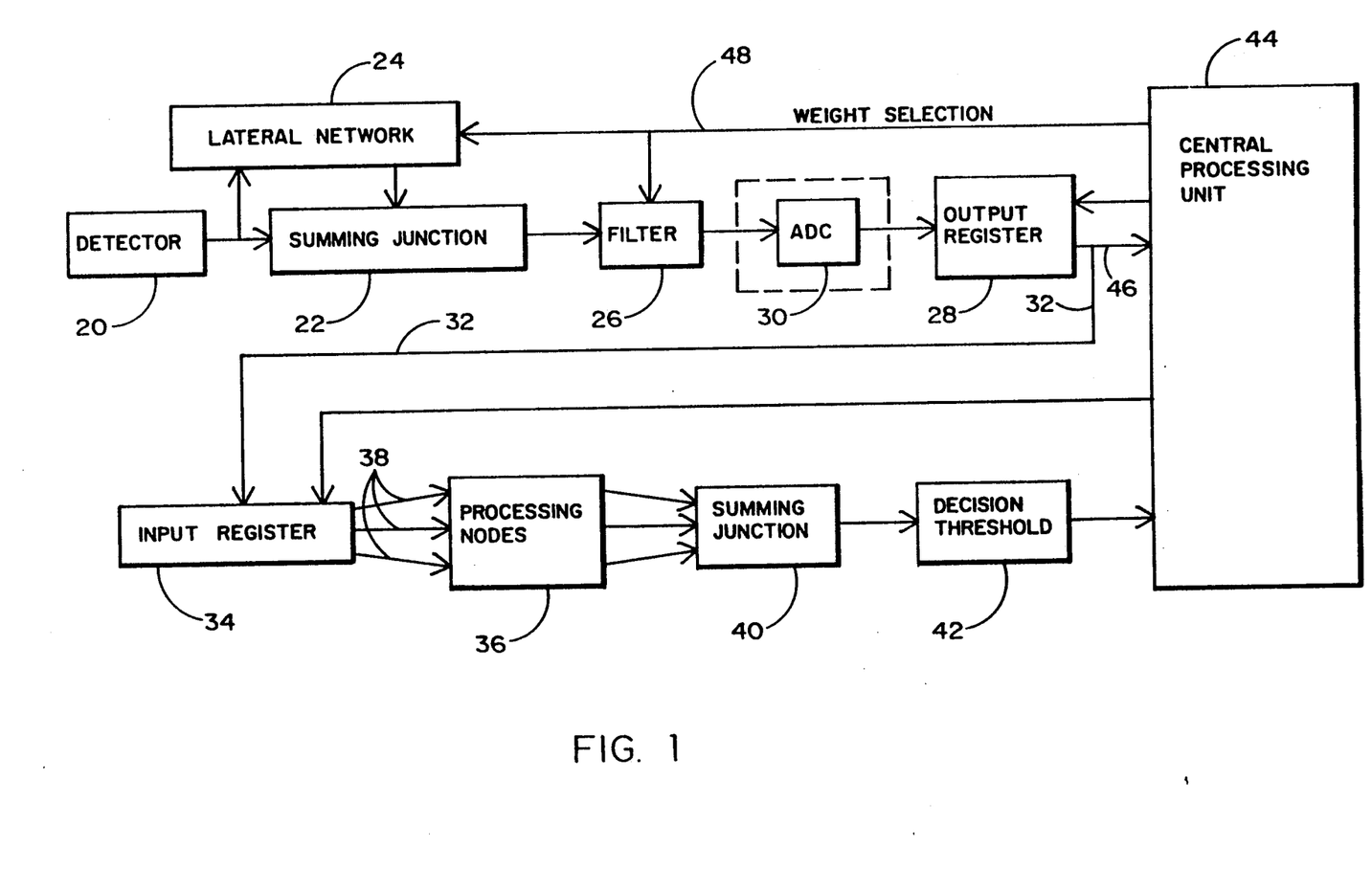
FIG. 1 shows diagrammatically a neural network system.

FIG. 1 is a diagram showing components of a neural network system. An input signal is received from a suitable source of information. A detector is indicated at 20. The input may be a photocell, or any of a variety of input receivers which can receive incoming information (e.g., optical or electronic) and output an electronic signal. A plurality of receivers 20 each sends a signal along one parallel signal processing channel. The output of each detector 20 is sent both to a summing junction 22 and to a lateral resistive layer 24. A signal from the lateral resistive layer 24 is sent to summing junction 22. From summing junction 22, a modified output signal passes along the channel, which includes a filter 26. Each channel normally will include amplifiers and other processing elements. The signal in each channel reaches an output channel selector 28, which contains switching or like elements to determine which channel outputs its signal at a given time. An analog to digital converter 30 may be included in the channel.

The system thus far described functions as the signal intake portion. Its output is fed into a processing system which uses the combined signals from a multiplicity of intake channels to make decisions. Such decisions provide information to stations external to the neural network, and also provide control signals for the internal functions of the neural network.

The selected signals from output channel selector 28 are directed along line 32 to an input channel selector 34 associated with the decision making portion of the neural network. The decision making portion comprises multiple parallel channels, and internal processing nodes 36 which compare parallel incoming signals 38 (from selector 34) for decision making purposes. From the internal processing nodes 36, signals move to a summing junction 40. The output signal of junction 40 goes to a decision threshold 42, whose output signal enters a central processing unit 44.

The central processing unit 44 also receives input signals at 46 from the output channel selector 28. Central processing unit 44, in most neural networks, will output control signals along line 48 to the lateral resistive layer 24 and the filter 26. The function of these control signals will be discussed below.

Figure 2:
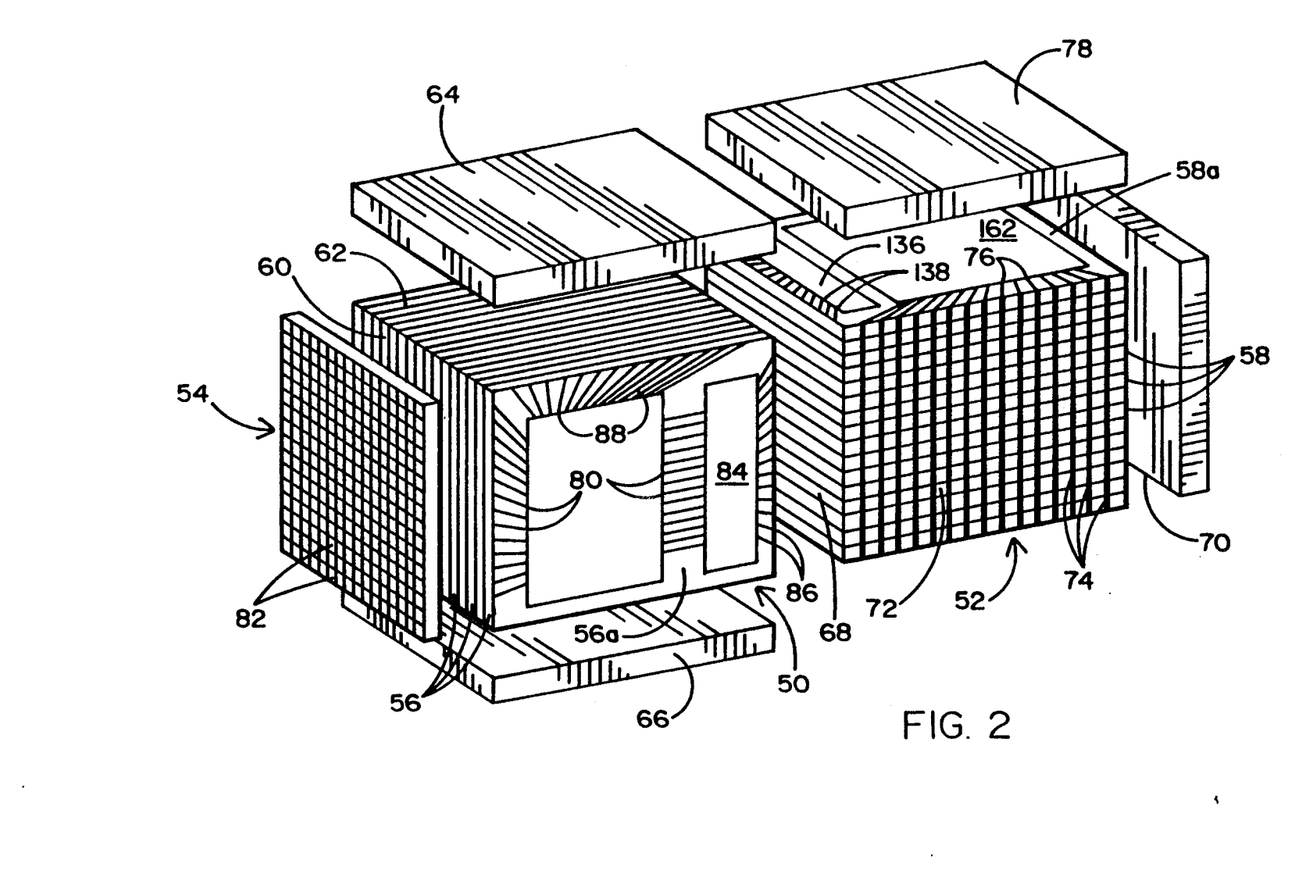
FIG. 2 shows isometrically hardward components which provide the major functions of a neural network system.

FIG. 2 is an isometric view of the basic hardware units of the neural network. The hardware units include two modules 50 and 52, each of which is formed by stacking a multiplicity of IC chips to provide a Z-technology module. Such Z-technology modules have been disclosed in various patents assigned to the assignee of this application, including U.S. Pat. Nos. 4,525,921; 4,551,629; 4,646,128; and 4,672,737.

The purpose of the Z-technology modules is to permit extremely high density of electronic components adjacent the input signals. Each chip in a module has a multiplicity of parallel signal channels, so that a given module can provide a signal-receiving (or signal-transmitting) access plane having a very dense two-dimensional array of signal-carrying leads. For example, a stack of 128 chips, each having 128 parallel channels, will provide 16,384 parallel channels. By connecting each channel to a separate photodetector, or other input receiver, a powerful information handling structure is achieved.

In FIG. 2, the module 50 is the signal input module, and the module 52 provides the internal processing nodes used in the neural net decision-making process. An input signal array 54, which may be a photocell array, is carried by one access plane of the module 50. As shown in FIG. 2, the stacked chips 56 of module 50 lie in vertical planes; and the stacked chips 58 of module 52 lie in horizontal planes. As will be explained, combining two Z-type modules, which are so oriented that their chips extend in planes at 90° angles to one another, makes it possible to have universally selective interconnectivity of every channel on one module with every channel on the other module. In other words, the output and input channel selectors 28 and 34 have the capability of choosing at a given time to connect any one of the thousands of channels on module 50 with any one of the thousands of processing nodes on module 52.

A unique value of the stacked chip modules for neural network implementation is their multiplicity of planar surfaces, most of which are herein referred to as access planes. Each module has a total of six planar surfaces. Four of the six are access planes which are reached by an extremely high number of electrical leads. As stated above, the module 50 may have 16,384 leads at each of four access planes. The left, or front, access plane 60 of module 50 is arranged to carry the input signal array 54. The top access plane 62 of module 50 is arranged to interface with the lower side of a planar layer 64, the purpose of which will be discussed below. The right, or rear, access plane (not seen in the figure) of module 50 is used to interface with module 52. And the fourth access plane (not seen in the figure) of module 50 may interface with a planar layer 66. The number of interface arrangements will depend on the desired complexity of the neural network.

The left, or front, access plane 68 of module 52 is used to interface with module 50. The rear access plane (not shown in the figure) of module 52 may interface with a planar layer 70. The two additional access planes of module 52 are its sides, one of which, 72, faces toward the viewer. In the disclosed embodiment, a plurality of vertical buses 74 provide electrical connection from leads 76 on each of the chips 58 to a planar layer 78, which may be used as a central processor (CPU).

In addition to its four access planes, each module has two flat module surfaces provided by its end chips. The CPU layer 78 is shown in engagement with the top chip of module 52. These chip-parallel module surfaces are useful locations for additional processing circuitry, but they do not provide the networking density of the four chip-perpendicular access planes of each module.

The chip 56$a$, the surface of which is uncovered in FIG. 2, represents each of the multiplicity of chips (e.g., 128) included in the module 50. Chip 56$a$ has in its circuitry a plurality (e.g., 128) of parallel channels 80. Each channel 80 receives an input analog signal from one of the sensors (or receivers) 82 included in the array 54. All of the parallel channels 80 terminate in a switching network, or channel selector, 84, which is capable of selecting any one of the channels for connection to any one of the outgoing leads 86 which reach the rear access plane of module 50. Each channel 80 on each chip includes numerous electronic components, which provide amplifying and filtering of each input signal. Each channel may include an A/D converter, if desired. It is assumed that the input signals on receivers 20 will normally have analog values. If an A/D converter is not included in each channel, downstream signals will continue to have analog values.

Each channel 80 on each chip is electrically connected by a separate lateral lead 88 to a node in a resistive network, which is an important component of the neural network. In FIG. 2, the resistive network is located on the lower surface of planar layer 64 which engages access plane 62 of module 50.

Figure 3:
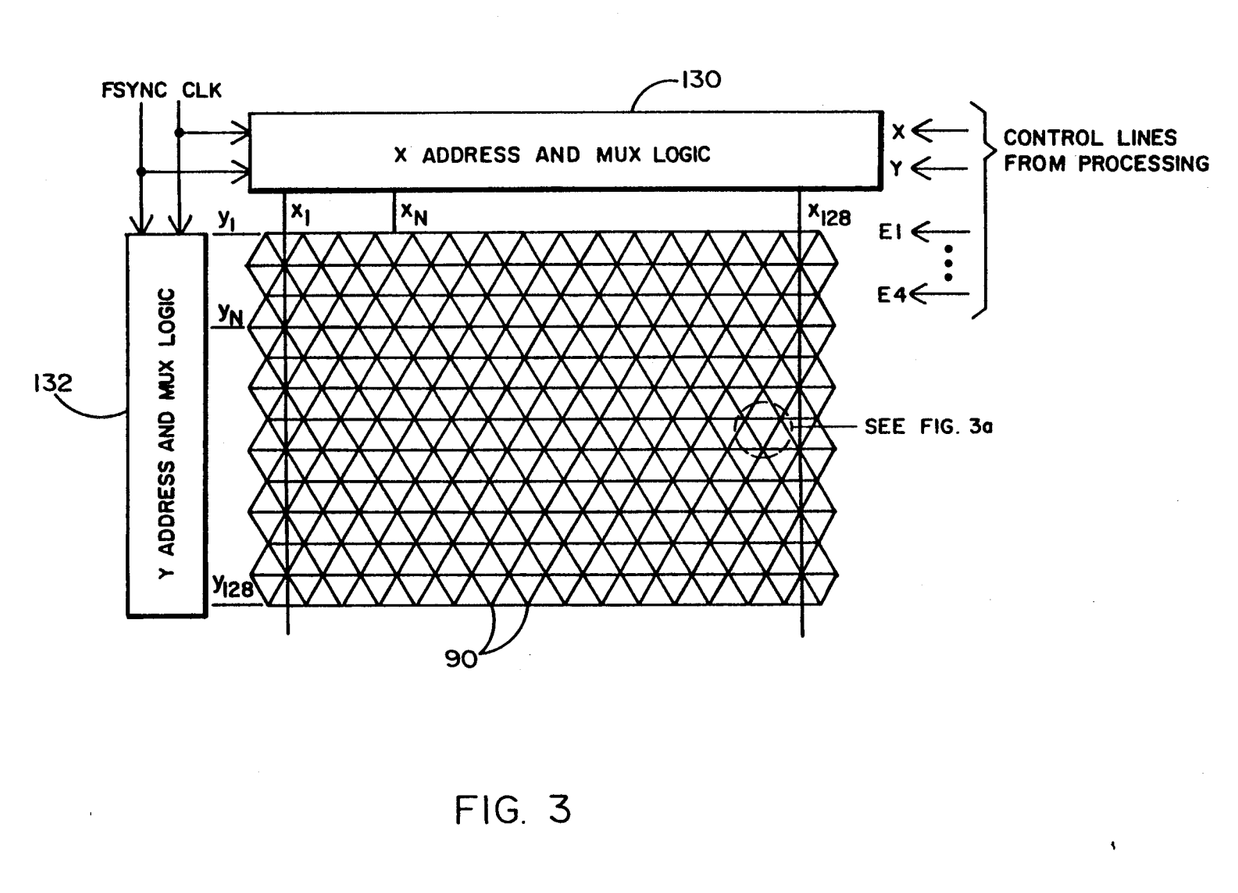
FIGS. 3 and 3a show schematically a network of nodes, each of which is connected to several adjacent nodes through resistance elements.
Figure 3A:
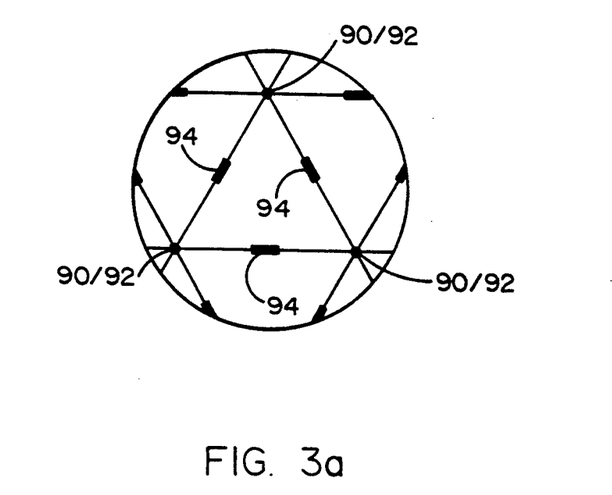

FIGS. 3 and 3a show schematically a resistive layer network. The network has a large number of nodes 90 (see FIG. 3a), one for each channel 80/88 (FIG. 2). In an array of 128 chips, each having 128 parallel channels, the resistive layer network requires 16,384 nodes 90. Each of the nodes 90 is electrically connected to one of the channels 80/88 via a circuit of the type shown in FIG. 4, and represented in FIG. 3a by a dot 92. And each of the nodes 90 is also electrically connected to a plurality of adjacent nodes, as shown in FIGS. 3 and 3a. Each interior node 90 is connected to six adjacent nodes. Each node-to-node connection includes resistance circuitry (represented by blocks 94 in FIG. 3a), which provides a desired level of node-to-node voltage transfer. FIG. 5 shows a variable lateral resistor circuit of the type represented by each block 94. The circuitry in the channel-to-node blocks 92 is preferably located on the respective IC chip; and the circuitry in the node-to-node blocks 94 is located on the lateral plane provided by layer 64.

Figure 4:
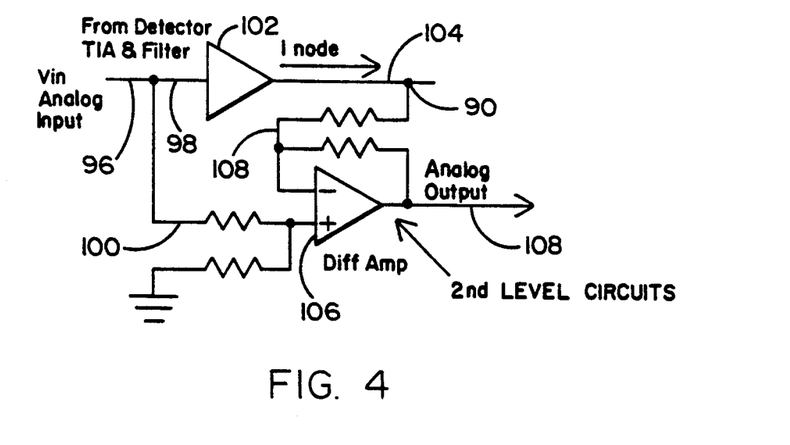
FIG. 4 shows an example of the circuitry between an individual node of FIG. 3 and an individual channel on a chip in the first stacked chip module of FIG. 2.
Figure 5:
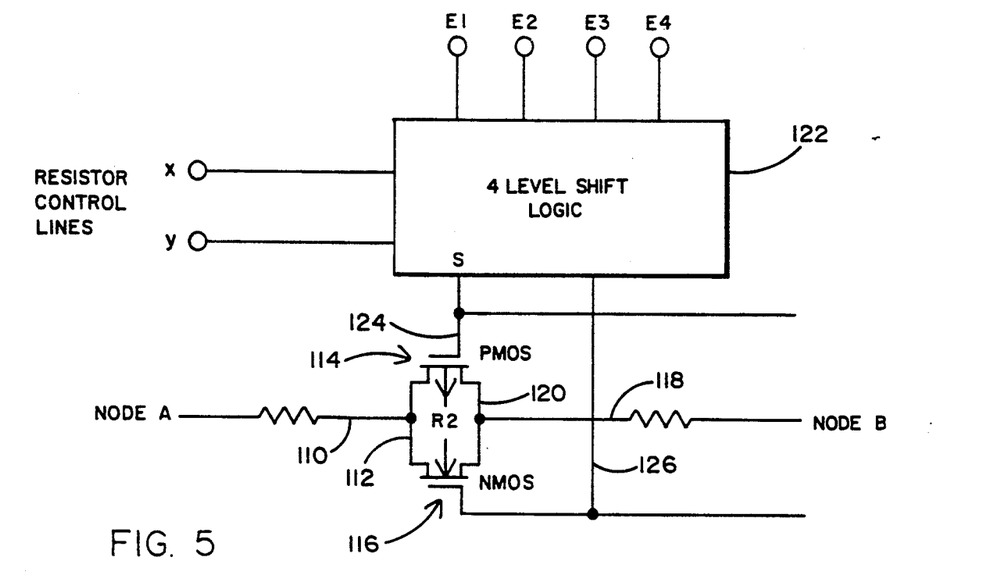
FIG. 5 shows an example of the variable resistance circuitry between a pair of adjacent nodes of FIG. 3.

As shown in FIG. 4, which represents one of the dots 92 in FIG. 3a, each input on a channel 80 (FIG. 2) enters on a line 96. This represents the analog voltage from the individual sensor (or other input signal) included in the array 54 (FIG. 2). It has been preamplified and filtered. Line 96 branches into lines 98 and 100. Line 98 is input to a buffer 102, the output of which is connected by line 104 to the respective node 90.

The branch line 100 connects to one input of a differential amplifier 106. The other input of differential amplifier 106 is connected by a line 108 to the voltage at node 90. The analog output of amplifier 106 thus represents the difference between the channel input voltage and the voltage at node 90, which is influenced by the voltages of the six other nodes to which it is connected in the resistive network of FIG. 3. The output signal on line 108 is the channel voltage which reaches the channel selector switching network 84 (FIG. 2).

FIG. 5 shows a node-to-node variable resistance connection between two adjacent nodes 90, which resistance connection is indicated diagrammatically by blocks 94 in FIG. 3a. Two adjacent interconnected nodes are identified as Node A and Node B. Node A is connected by a line 110 to a line 112, one end of which extends to a PMOS FET 114, and the other end of which extends to an NMOS FET 116. Node B is connected by a line 118 to a line 120, the ends of which extend to PMOS FET 114 and NMOS FET 116. Voltage level shift logic represented by block 122 is connected by a line 124 to the gate of FET 114, and by a line 126 to the gate of FET 116.

The node-to-node resistance circuitry permits variation of the weight (resistance) of each node-to-node connection, under the control of external signals, e.g., signals from CPU 44 (FIG. 1) on layer 78 (FIG. 2). In FIG. 3, control lines X and Y from the CPU are used to select a given node by providing an X address and a Y address, via logic circuitry at blocks 130 and 132. In FIG. 5, the X and Y input lines are shown entering the left side of logic block 122.

The effect of the comparison of voltages at adjacent nodes is to increase the relative brightness of a channel signal which has a high incoming voltage, by reducing the voltages of the adjacent channels. This circuitry thus enhances the visibility (in a photodetector embodiment of the invention) of points and edges. This simulates the operation of the human eye. This concept is not, of itself, a contribution of the present disclosure.

The effect of the variability of resistances between individual nodes, which is referred to as changing "weights" in the neural network, is valuable in reaching decisions as to image identification. Weight variability permits placing more emphasis on certain image characteristics and less emphasis on other image characteristics. In other words, weight variation is highly effective in concentrating on that incoming information which is most useful in making pattern recognition decisions in the neural network.

Figure 6A:
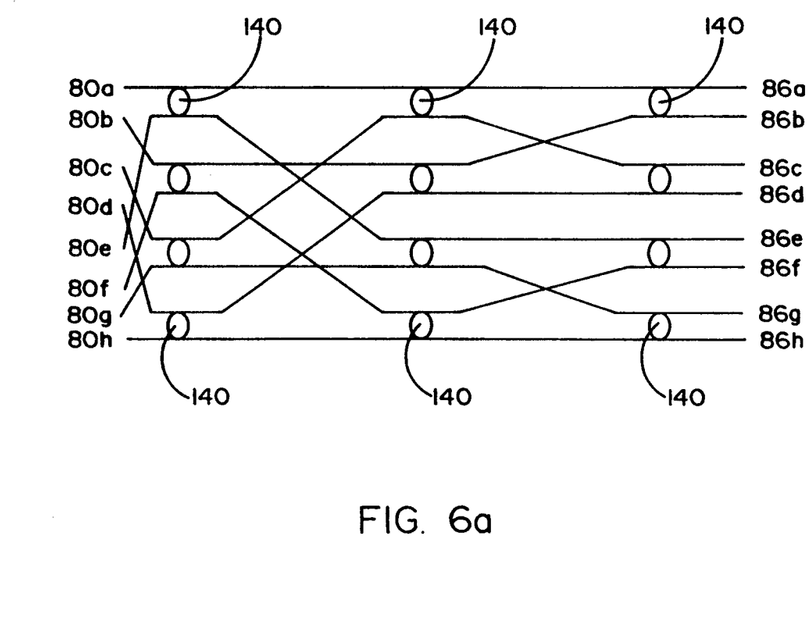
FIG. 6A and 6B illustrate a switching network designed to permit selection of the signal from any channel on a given chip in the first module of FIG. 2 for transmittal to the second module.
Figure 6B:
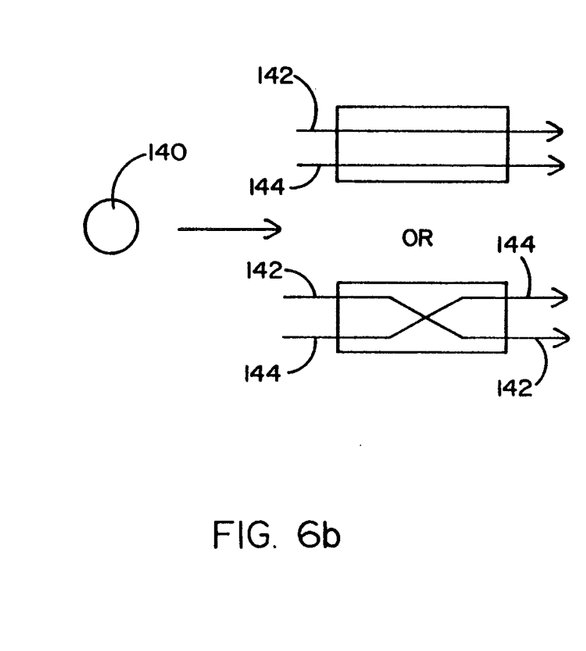
Figure 7:
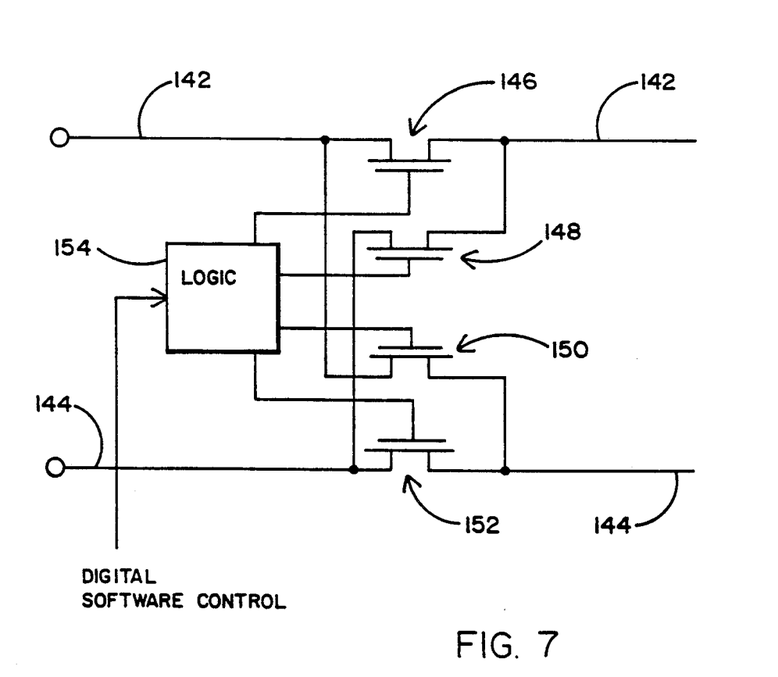
FIG. 7 is a diagram of a switching network between any two of the lines in FIG. 6B.

FIG. 6A, 6B and 7 relate to the switching network 84 of FIG. 2, one of which networks is on each chip 56 in module 50. Each switching network 84 has 12 parallel incoming lines 80 and enough outgoing lines 86 to reach every chip 58 in module 52. The top chip 58a in module 52 is visible in FIG. 2. It has a switching network 136, from which a plurality of lead lines 138 extend to access plane 68 of module 52. The number of such lead lines 138 preferably equals the number of chips in module 50, since each lead 138 is connected to a different one of the chips 56. The number of lead lines 86 equals the number of chips in module 52, since the top lead 86 is connected to the top chip 58a of module 52, the next lead 86 is connected to the next chip 58, and so forth.

FIG. 6A shows an 8-line portion of the switching network 84 on each chip in module 50. At the left are shown eight incoming lines 80a through 80h. At the right are shown eight outgoing lines 86a through 86h. Each circular symbol 140 represents a two-way switching device of the type diagrammed in FIG. 6B. In the latter figure, switching between the two lines 142 and 144 is illustrated. In FIG. 6A, the use of three columns of switching elements 140, each column containing four of the elements 140, permits connection of any one of the incoming lines 80a through 80h to any one of the outgoing lines 86a through 86h. If it is assumed that there are 128 incoming lines 80 and 128 outgoing lines 86, seven columns of elements 140, each column having 64 elements, would be required. Each column doubles the number of possible connections, and a 128-to-128 switching network needs $2^7$ options. Note that the switching network in FIG. 6 (and also in FIG. 9) is designed to cause throughput of analog signal values.

The number of chips in module 52 may be different from the number of chips in module 50, but the number of such chips preferably equals the number of channels on each chip in module 50. For the sake of clarity and simplicity, it will be assumed that modules 50 and 52 have the same number of chips.

FIG. 7 is a simple diagram of FET switching network between two lines, i.e., lines 142 and 144 of FIG. 6B. Four switching FETs are shown: 146, 148, 150 and 152. They are under control of logic circuitry 154. If none of the FETs are enabled, no signal is passing through. If FET 146 is enabled, input line 142 and output line 142 are connected. If FET 148 is enabled, input line 144 and output line 142 are connected. If FET 150 is enabled, input line 142 and output line 144 are connected. And if FET 152 is enabled, input line 144 and output line 144 are connected.

The module 52 is the primary location of the processing nodes in the neural network system. These nodes are used in a decision-making network which determines, using the incoming signals from module 50, what conclusions can be drawn concerning the significance of the incoming information. Pattern recognition provides identification of a "sighted" object. The conclusions may be reached, as suggested in FIG. 1, by progressively reducing the number of possibilities until a decision is provided at CPU 44.

Specific neural network architecture is beyond the scope of the present application. An example of the type of circuitry which might be located in the available area 162 on each of the chips 58 is the Intel "Electrically Trainable Analog Neural Network" (ETANN), a block diagram of which is identified as 80170NW, and shown in an Intel catalogue.

Figure 8:
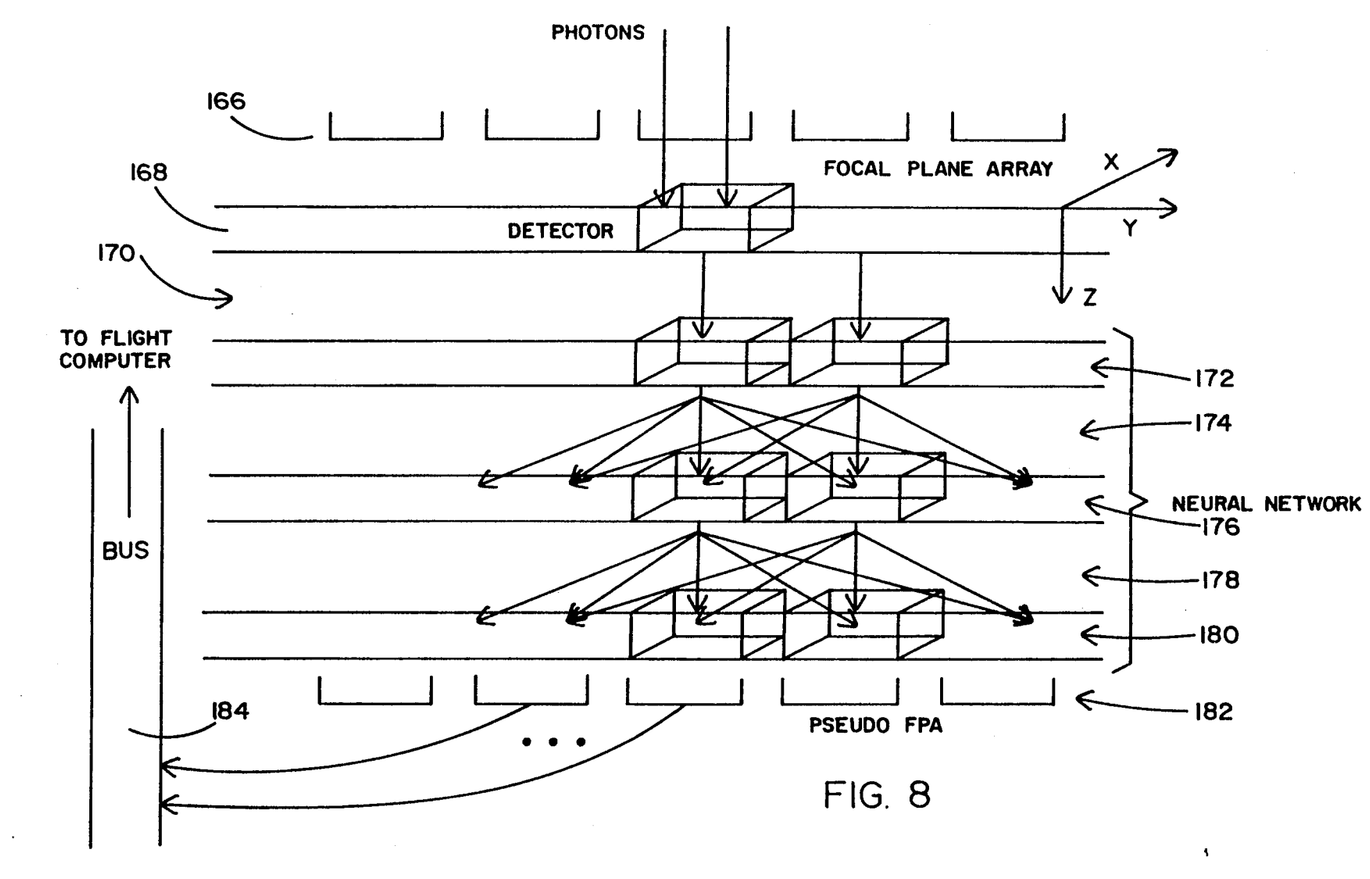
FIG. 8 is a diagrammatic illustration of a neural network system.

Another example of a neural network system is diagrammatically illustrated in FIG. 8. It shows the steps in the creation of a "pseudo" focal plane at the output of a neural filter. The steps symbolized in FIG. 8 proceed as a series of layers starting at the top of the figure. At the top layer 166, a focal plane array is indicated. Photons from the viewed scene are processed by an array of detectors 168 and, at layer 170, further processed by the circuitry discussed above (module 50). In the neural network, the top layer 172 comprises neural network input nodes. Layer 174 represents feedforward weighted interconnections. Layer 176 represents neural network "hidden" nodes. The term "hidden" signifies that a node is part of the inner circuitry, which is not in either an input channel or an output channel. In other words, a hidden node is not connected to external circuitry, but it is available to function on demand as a part of the neural processing network.

Layer 178 in FIG. 8 represents a second interconnection layer, comparable to layer 174. Layer 180 comprises neural network output nodes. The number of interconnection layers and of hidden node layers will, of course, be selected to satisfy the neural network algorithm.

The neural network output layer 180 creates, in effect, a "pseudo focal plane array" 182. In an airborne system, information from the array 182 might be conveyed by a bus 184 to a flight computer.

The preferred neural network systems are trainable, i.e., they incorporate automatic learning procedures. At least two potential learning procedures exist: (1) competitive learning with a Kohonen self-organizing map or a Neocognitron variant, and (2) gradient descent learning such as a multi-layer perception with back-propagated error. Competitive networks are self-organizing, unsupervised, and learn continuous time-space patterns. The continuous spatio-temporal nature of real signature data, as opposed to noise, is used to recognize and reinforce important parts of the intensity patterns from the detectors. On the other hand, gradient descent learning uses a supervised approach to learning weight changes. Desired outputs are paired with detector signals and used to train the neural network. Either of these neural models, in essence, produces a secondary focal plane array (FPA) that contains calibrated and adaptively thresholded intensity signals. This "pseudo focal plane" would be the analog or digital output of an array of artificial neurons assigned the job of corresponding to particular detectors. Existing techniques for random access of data off the focal plane would be applied to the neural net output array.

Figure 9:
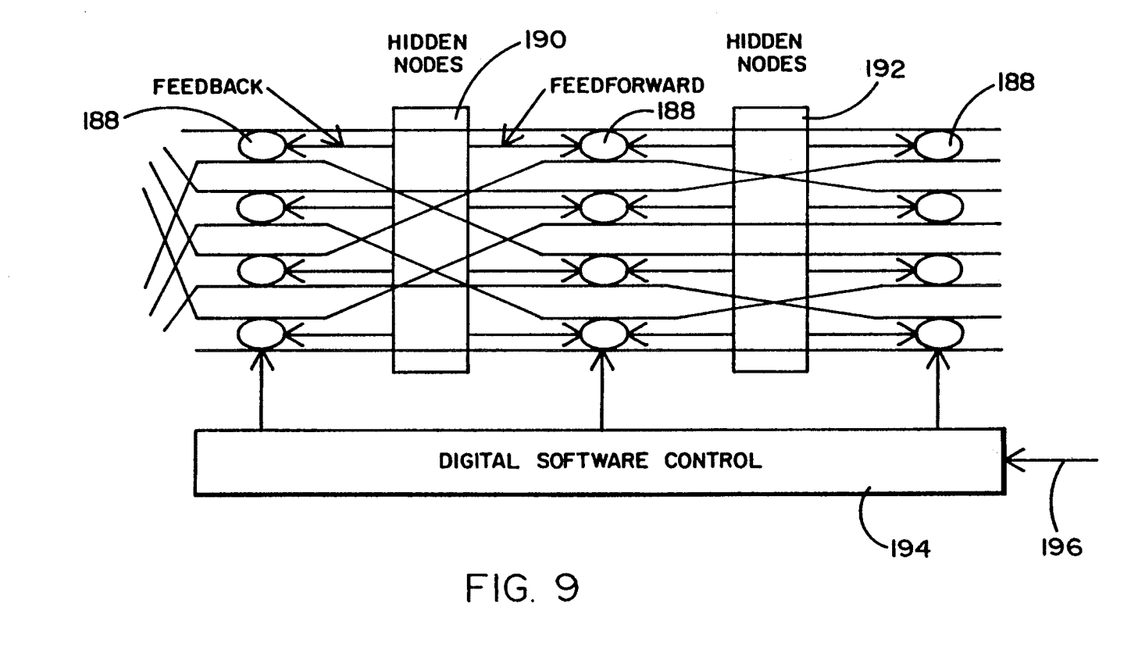
FIG. 9 shows schematically an input switching network of the second module.
Figure 10:
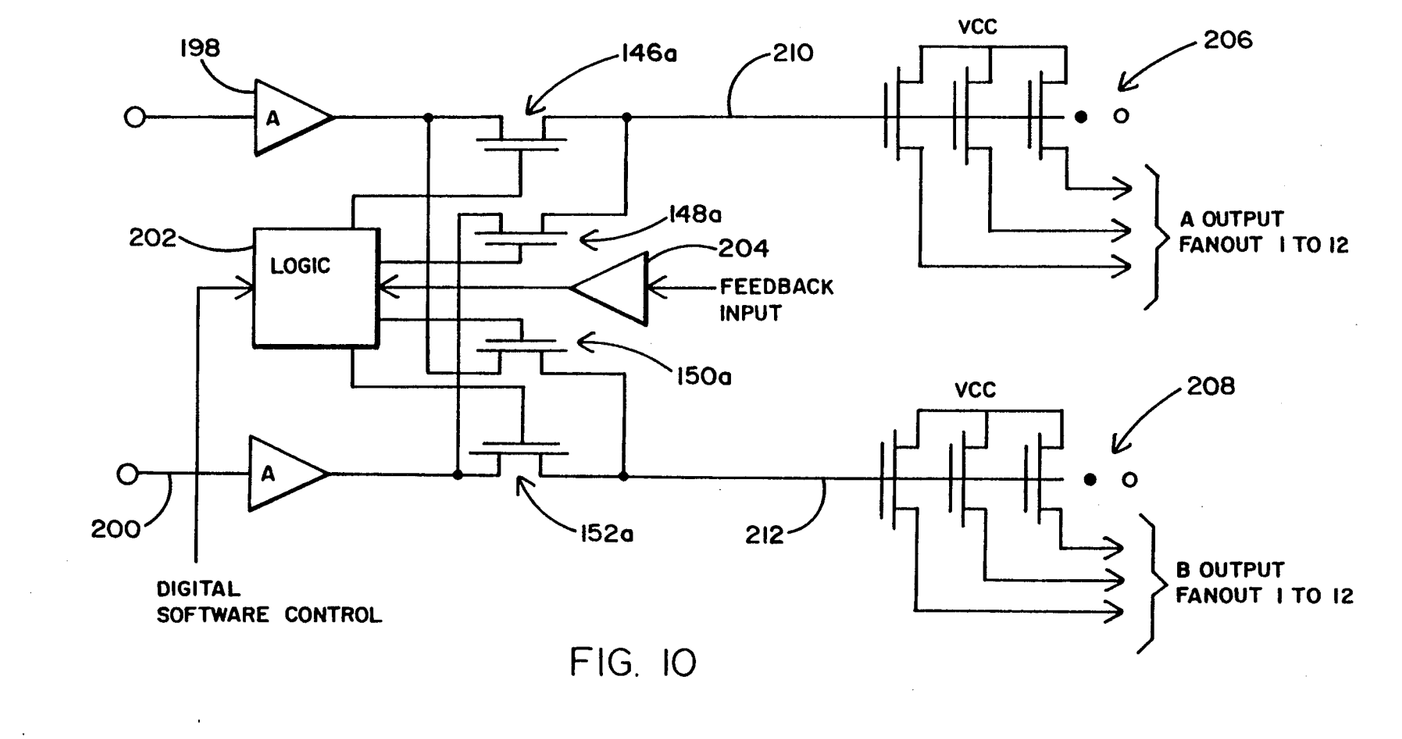
FIG. 10 shows schematically detailed circuitry of the type included in FIG. 9.

FIGS. 9 and 10 illustrate the input switching and neural network switching of the chips 58 of module 52. FIG. 9 shows eight incoming leads in the sorting lead selector 136 on each chip. Each of the circular symbols 188 symbolizes a switching element comparable to the element 140 in FIG. 6A, and shown in greater detail in FIG. 6B.

Blocks 190 and 192 represent groups of hidden nodes, which are bypassed by the lines which proceed directly to an element 188 in the next column of such elements. As shown signals can be carried between the switching elements 188 and the hidden nodes, under the logic control of software indicated by a control block 194. External control of block 194 is symbolized by line 196.

The outputs of one switching layer (column) can be processed (weighted, summed or thresholded); and results can be used to control preceeding/succeeding switches (feedback).

FIG. 10 shows two incoming lines 198 and 200, which are lines of the type shown at 138 in FIG. 2. Four FET switches 146a, 148a, 150a, and 152a perform the same functions as the FET switches in FIG. 7. Logic control is indicated by block 202. A feedback signal control is indicated at 204. The FET banks 206 and 208 at the right side of the figure symbolize a fanout network. This fanout network permits the signal on each of the lines 210 and 212 to be sent simultaneously to as many as 12 processing nodes in the neural network circuitry of module 52.

From the foregoing description, it will be apparent that the apparatus disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. A neural network signal processing system comprising:

a two dimensional array of signal receivers which process input signals from an exterior source;

an input signal module formed of stacked, secured-together layers, each layer an IC chip which contains both integrated circuitry and a plurality of separate electrical lines each carrying the input signals from one of the signal receivers;

the module of stacked layers having a plurality of flat access planes on each of which are terminals which constitute a two-dimensional array of signal-carrying leads;

a first access plane of the module having its leads individually connected to separate input signal receivers;

a neural network processing unit having integrated circuitry providing an array of neural network processing nodes, and having a planar surface carrying a two-dimensional array of terminals whose leads extend to the respective nodes;

a second access plane of the module having its leads connected to those terminals on the neural network processing unit whose leads extend to the respective nodes.

2. The neural network system of claim 1 in which the neural network processing unit: has its planar surface in engagement with the second access plane on he module; and contains embedded integrated circuitry which provides a resistive network having an array of nodes each associated directly with one of the input-signal-carrying electrical lines, and each also connected to a plurality of adjacent nodes in the resistive network.

3. The neural network system of claim 2 which also comprises:

a resistance element in each connection from one node to an adjacent node.

4. The neural network system of claim 3 which also comprises:

means for varying the resistance in any resistance element in order to vary the signal carried by each of the input-signal-carrying electrical lines.

5. The neural network system of claim 4 which also comprises:

a computer included in the neural network system; and means under control of the computer for sending a signal to any selected resistance element in the resistive network in order to vary the signal value at a given node.

6. The neural network system of claim 1 in which the neural network processing unit is a decision-processing module formed of stacked, secured-together layers, each layer an IC chip which contains both integrated circuitry and a plurality of separate electrical lines each adapted to carry a signal which has been processed by the integrated circuitry of the input signal module;

the decision-processing module having one or more flat access planes on which are terminals which constitute a two-dimensional array of signal-carrying leads;

the access plane of the decision-processing module interfacing with one of the access planes of the input-signal module to interconnect the terminals of their respective arrays;

the integrated circuitry of the IC chip layers of the decision-processing module containing a multiplicity of neural network nodes which are part of an integrated neural network processing system.

7. The neural network system of claim 6 in which the layers of the decision-processing module are in planes which are at right angles to the planes of the layers of the input-signal module, in order to permit connection of any electrical line on one of the modules to any electrical line on the other module.

8. The neural network system of claim 7 which comprises:

an output channel selector on each layer of the input-signal module which can connect the signal on any electrical line on said layer to any layer of the decision-processing module.

9. The neural network system of claim 7 which comprises:

an input channel selector on each layer of the decision-processing module which can connect the signal on any electrical line on said layer to any layer of the input-signal module.

10. The neural network system of claim 7 which comprises:

an output channel selector on each layer of the input-signal module which can connect the signal on any electrical line on said layer to any layer of the decision-processing module; and an input channel selector on each layer of the decision-processing module which can connect the signal on any electrical line on said layer to any layer of the input-signal module.

11. The neural network system of claim 6 which also comprises:

a computer included in the neural network system; and means under control of the computer for sending a signal to any of a multiplicity of nodes in the decision-processing module, in order to vary the decision-processing system.

12. The neural network system of claim 1 in which at least three flat access planes of the input-signal module are available for external connection;

the first such access plane being associated with the array of input signal receivers;

the second such access plane being associated with the access plane of the decision-processing module; and the third such access plane being associated with the neural network processing unit which contains the resistive network array of nodes.

13. A neural network signal processing system comprising:

a first module formed of stacked, secured-together layers, each layer an IC chip which contains embedded integrated circuitry and a plurality of separate electrical channels, each having a plurality of connections to circuitry other than the embedded integrated circuitry;

the first module having a plurality of flat access planes, each of which has a two-dimensional array of electrical leads connected to the electrical lines on the respective IC chip layers of the first module;

a second module formed of stacked, secured-together layers, each layer an IC chip which contains embedded integrated circuitry and a plurality of separate electrical channels, each having a plurality of connections to circuitry other than the embedded integrated circuitry;

the second module having a flat access plane which has a two-dimensional array of electrical leads connected to the electrical lines on the respective IC chip layers of the second module;

the flat access plane of the second module interfacing with one of the flat access planes of the first module in a structural combination in which the IC chip layers of the second module extend in planes perpendicular to the planes of the IC chip layers in the first module;

means for electrically interconnecting electrical leads on the interfacing access planes; and means for selectively connecting different leads on different layers of one of the interfacing access planes to different leads on different layers of the other interfacing access plane.

14. The neural network system of claim 13 in which the selectively connecting means comprises:

a plurality of two-way switching devices connected in series in rows in which the analog values of the transmitted signals are retained throughout as analog values;

the number of columns of such two-way switches corresponding to the number of binary digits required to provide the total number of optional paths.

* * * * *